Nov. 11, 1952        J. F. HART        2,617,571
APPAREL SUPPORT
Filed May 26, 1948
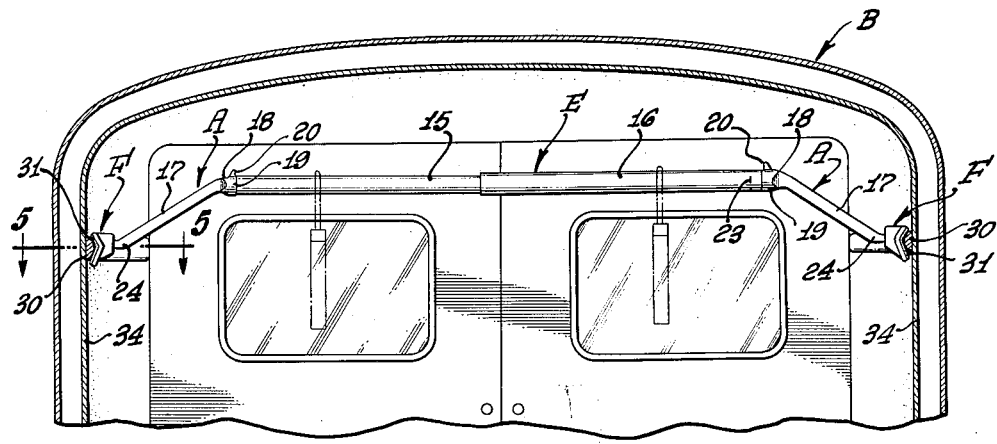
Fig. 1.
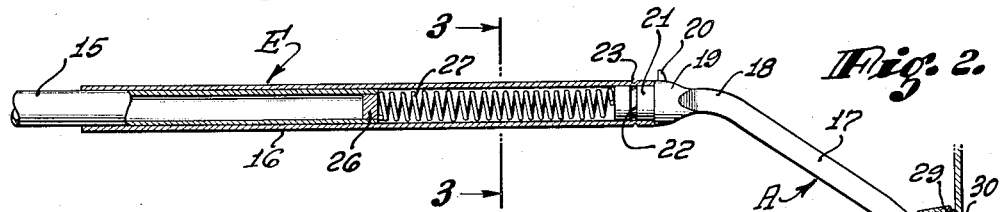
Fig. 2.
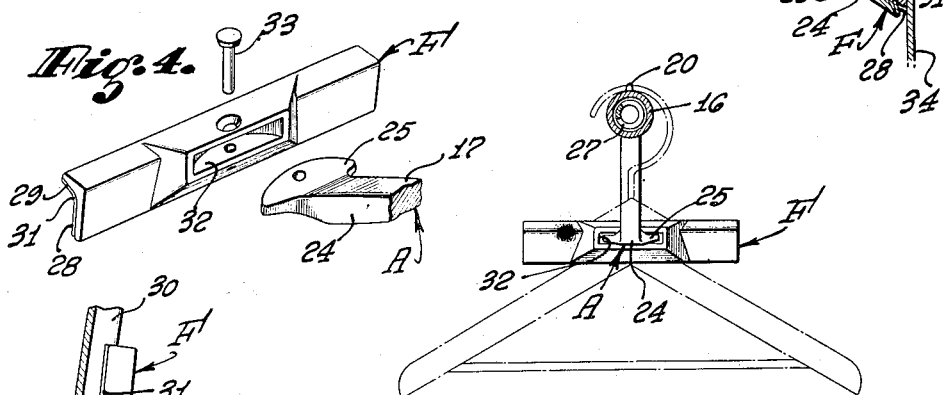
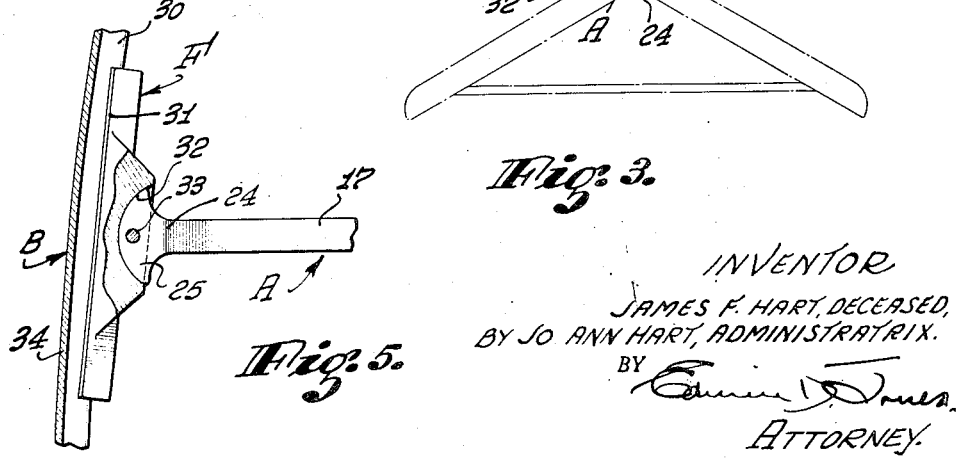
Fig. 3.
Fig. 5.
INVENTOR
JAMES F. HART, DECEASED,
BY JO ANN HART, ADMINISTRATRIX.
BY
ATTORNEY.

Patented Nov. 11, 1952

2,617,571

UNITED STATES PATENT OFFICE 2,617,571

APPAREL SUPPORT

James F. Hart, deceased, late of Bishop, Calif., by Jo Ann Hart, administratrix, Bishop, Calif., assignor of one-half to Jo Ann Hart and one-half to Alberta M. Talmadge, both of Bishop, Calif.

Application May 26, 1948, Serial No. 29,238

3 Claims. (Cl. 224—42.1)

This invention relates to supports of the character embodied in the copending application, Serial No. 669,313, filed May 13, 1946, by the applicant herein, now U. S. Patent 2,532,909 designed for application interiorly to the body of an automobile for suspending within the body a large number of wearing apparel such as dresses, suits or overcoats, arranged on conventional hangers.

In the use of the support of said prior application it was found that while ideally adapted for application to car bodies of conventional shape, it was not adaptable to bodies of stream-lined form wherein the side walls are of decided longitudinal curvature, because the feet of the support are rigid on the rod members and, hence, cannot have sufficient contact with the curved side body walls as to effectively support the rod members in elevation position within the body.

It is a purpose of the present invention to provide an apparent support in which the foot members thereof are movably mounted on the rod members of the support to automatically conform to any longitudinal curvature of the molding strips on the side walls of a stream-lined vehicle body at the points and engage against the upper and lower surfaces of the molding strips on such walls, and in such manner as to have contact at spaced points in their length with such molding strips so as to securely support the rod members in elevated position without danger of being twisted loose from the moldstrips within the body. A support with feet so mounted permits it to be applied to the car body at any desired location along the length thereof.

There will be described only one form of apparel support embodying the invention and there will then be pointed out the novel features thereof in claims.

In the accompanying drawings:

Fig. 1 is a view showing in side elevation one form of apparel support embodying the invention in applied position in the stream-lined body of an automobile, and wherein the body is shown in transverse fragmentary section and looking to the rear thereof.

Fig. 2 is an enlarged fragmentary sectional view, partly in elevation of the support shown in Fig. 1, and as applied to the molding strip of an automobile body.

Fig. 3 is a vertical sectional view taken on the line 3—3 of Fig. 2 and showing a clothes hanger on the support.

Fig. 4 is a perspective view showing one of the feet of the support and one of the connecting heads, the two being separated to more clearly show the socket in the foot.

Fig. 5 is an enlarged sectional view taken on the lines 5—5 of Fig. 1.

With specific reference to the drawings, the support, in its present form comprises an elongated member E which may be made up of two tubular rods 15 and 16 of slightly different internal dimensions so that one rod 15 may telescope within the other.

Secured on the distal ends of the rods 15 and 16 are crank arms A of identical construction and made up of a metal casting to form a linear portion 17 curved at its upper end as indicated at 18, where a head 19 is provided and formed with a projection 20. Integral with the head 19 is a plug 21 which extends into the distal end of the rod 16, as shown in Fig. 2. This plug is provided with an annular groove 22 into which the metal of the rod 16 may be instruck circumferentially to form an internal annular bead 23 for securing the plug against removal from the rod.

The other end of the lineal arm portion 17 is bent at an angle, as indicated at 24, and formed with a head 25 which constitutes part of a connection between the arm and a foot F, as will be more fully described hereinafter. As shown in Fig. 2, the inner end of the rod 15 has a plug 26 welded or otherwise secured therein to form an abutment for one end of a coiled expansible spring 27, the plug 21 providing an abutment for the other end of this spring. Obviously, the spring serves to urge the two rods apart to hold the member E as a whole in extended position when applied to the interior of a car body to maintain the feet F in engagement with the vertical sidewalls of such body or against molding strips should the body be provided with such strips. It will be understood, of course, that other means than a spring may be employed for extending the rods 15 and 16 lengthwise relatively outward and so holding them as to maintain the feet against the vertical sidewalls of the car body or against the molding strips.

Each foot F comprises an elongated body channeled on its outer side face to provide angularly related surfaces 28 and 29, the arrangement of these surfaces being adapted for engagement with the inwardly projecting surface of the usual molding strip 30 on the inner side of a car body B (see Fig. 2). Preferably these surfaces are covered with a strip of felt 31 to prevent marring of the molding strip.

As best shown in Figs. 4 and 5, the inner side of each foot F is formed with a socket 32 in which the head 25 of the arm A is received so that the foot is mounted on the arm for rocking or angular adjustment in a horizontal plane. In the present instance, the head 25 is flat and of arcuate form, and the socket 32 is correspondingly shaped to receive the head and to thus allow restricted pivotal movement of the foot on the arm. As viewed in Figs. 1 and 2, the head 25 is disposed horizontally so that when engaged within the socket 32 the foot F is mounted on the arm for pivotal movement about a vertical axis, and, hence, in a plane paralleling that of the member E.

To prevent accidental displacement of the foot from the arm a pin 33 is extended through the top wall of the socket 32 and through the head 25, suitable openings being formed for this purpose and the opening in the foot being countersunk so that the head of the pin will be flush with the upper surface of the foot.

In practice, the apparel support is adapted for use in the body B which is of stream-lined form, with the side walls 34 curved longitudinally in a horizontal plane from one end to the other. The support may be easily applied to such a body at any point along the length thereof, by first placing one of the feet F horizontally against one of the molding strips so that the two surfaces 28 and 29 have bearing contact therewith, and out of contact with the wall 34. Following this operation the two rods 15 and 16 are telescoped sufficiently and against the resistance of the spring 27, to permit the other foot F to be brought into engagement with the other molding strip 30. Thus when the rods are released the spring will serve to maintain the feet in engagement with the strips. As the support is so applied, the arms A extend downwardly from the ends of the member E so that such member is supported in an elevated position adjacent the top of the body B.

Where the molding strips are longitudinally curved in order to conform to the curvature of the walls 34 the feet F, through the head and socket connections, are automatically adjustable to conform to such curvature so that they have bearing contact at spaced points with the molding strips. Thus the feet effectively operate to support the member E in elevated position across the body B and without the possibility of the feet becoming disengaged from the molding and allowing the support to fall.

Further, the firm engagement of the molding strips provided by the feet allows the support to sustain a load of many garments through the employment of the conventional hangers as will be clear from a consideration of Fig. 3. The projections 20 on the heads 19 serve to prevent displacement of the hangers longitudinally from the member E which, if permitted, would allow the hangers or the apparel thereon to slide downwardly on the arms A.

While as shown and described the feet of the support engage the molding strips of a car body, it is to be understood that the feet may be made with plane surfaces to engage the side walls of the car body.

What is claimed is:

1. An apparel support adapted for use in an automobile body having longitudinally curved vertical side walls; including: a pair of axially alined rods; a pair of arms fixedly secured to the distal ends of said rods and extending downwardly and laterally therefrom; heads fixed on the lower ends of the arms and disposed in a plane paralleling the plane of said rods; a pair of elongated feet having longitudinally extending sockets receiving said heads so that said feet can pivot only in the plane of the heads whereby, when said feet are in engagement with the vertical side walls of an automobile body, they will be self-conforming to the longitudinal curvature of such walls to have contact therewith throughout their length; and means for extending said rods lengthwise relatively outward and so holding them as to maintain the feet in engagement with such body walls.

2. An apparel support as embodied in claim 1, wherein said sockets and said heads are of flat and circuate form; and pins extending through said sockets and said heads for securing the heads against displacement from the sockets.

3. An apparel support adapted for use in an automobile body having longitudinally curved vertical walls, including: a pair of tubular and axially alined rods; a pair of arms extending downwardly and laterally from the distal ends of said rods and fixedly secured thereto by plugs on the upper ends of said arms fitting into said rod ends and provided with annular grooves; annular beads internally of the rods engaging with said grooves; elongated feet on the lower ends of said arms pivotally connected between their ends so as to be movable in planes intersecting the planes of said arms, whereby, when said feet are in engagement with the side walls of an automobile body, they will be self-adjusting to the longitudinal curvature of such walls to have contact therewith throughout their length; and means for extending said rod lengthwise relatively downward and so holding them as to maintain said feet in engagement with the said walls of the automobile body.

JO ANN HART,
*Administratrix of the Estate of James F. Hart, Deceased.*

REFERENCES CITED

The following references are of record in the file of this patent:

UNITED STATES PATENTS

| Number | Name | Date |
|---|---|---|
| 89,348 | Roper | Apr. 27, 1869 |
| 924,545 | Emmert | June 8, 1909 |
| 1,107,624 | Mann | Aug. 18, 1914 |
| 1,425,247 | Galbraith | Aug. 8, 1922 |
| 2,121,572 | Polden et al. | June 21, 1938 |
| 2,139,188 | Haislip | Dec. 6, 1938 |
| 2,253,423 | Fellers et al. | Aug. 19, 1941 |
| 2,499,560 | Bailey | Mar. 7, 1950 |
| 2,522,174 | Hermsmeyer | Sept. 12, 1950 |
| 2,528,794 | Seidler | Nov. 7, 1950 |
| 2,532,909 | Hart | Dec. 5, 1950 |
| 2,558,717 | Davis | July 3, 1951 |